(12) United States Patent
Wurtenberger et al.

(10) Patent No.: US 8,892,093 B1
(45) Date of Patent: Nov. 18, 2014

(54) WIRELESS COMMUNICATION SYSTEM FOR INCREASING THE RESCAN TIMER IN A WIRELESS COMMUNICATION DEVICE

(75) Inventors: Andrew Mark Wurtenberger, Olathe, KS (US); Sachin R. Vargantwar, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 1147 days.

(21) Appl. No.: 12/768,222

(22) Filed: Apr. 27, 2010

(51) Int. Cl.
*H04W 8/12* (2009.01)
*H04W 8/04* (2009.01)
*H04W 8/06* (2009.01)

(52) U.S. Cl.
USPC ............. 455/433; 455/422.1; 455/432.1; 455/550.1; 455/575.9; 370/252

(58) Field of Classification Search
USPC .......................................... 370/252; 455/433
See application file for complete search history.

(56) References Cited

U.S. PATENT DOCUMENTS

| | | | |
|---|---|---|---|
| 5,119,502 A | 6/1992 | Kallin et al. | |
| 5,666,355 A | 9/1997 | Huah et al. | |
| 5,842,122 A | 11/1998 | Schellinger et al. | |
| 5,995,829 A * | 11/1999 | Broderick | 455/418 |
| 6,282,419 B1 * | 8/2001 | Findikli | 455/434 |
| 6,400,948 B1 | 6/2002 | Hardin | |
| 6,775,531 B1 | 8/2004 | Kaewell et al. | |
| 7,174,188 B2 | 2/2007 | Kiyomoto et al. | |
| 7,197,312 B2 * | 3/2007 | Gunaratnam et al. | 455/445 |
| 7,263,078 B2 * | 8/2007 | Krantz et al. | 370/328 |
| 7,263,358 B2 | 8/2007 | Chiou | |
| 7,330,727 B2 | 2/2008 | Korneluk et al. | |
| 7,480,519 B2 | 1/2009 | Jeong et al. | |
| 7,593,727 B2 * | 9/2009 | Zhao et al. | 455/432.1 |
| 7,676,223 B2 * | 3/2010 | Das et al. | 455/422.1 |
| 7,697,934 B2 * | 4/2010 | Vikberg et al. | 455/435.2 |
| 8,200,220 B2 * | 6/2012 | Guo et al. | 455/435.1 |
| 8,285,315 B1 * | 10/2012 | Lan et al. | 455/466 |
| 2004/0106423 A1 * | 6/2004 | McGowan et al. | 455/522 |
| 2004/0192254 A1 * | 9/2004 | Choi et al. | 455/411 |
| 2004/0224696 A1 * | 11/2004 | Korneluk et al. | 455/449 |
| 2005/0037755 A1 * | 2/2005 | Hind et al. | 455/435.3 |
| 2005/0227719 A1 * | 10/2005 | Gunaratnam et al. | 455/510 |
| 2006/0003768 A1 * | 1/2006 | Chiou | 455/436 |
| 2006/0058056 A1 * | 3/2006 | Das et al. | 455/524 |
| 2006/0258386 A1 | 11/2006 | Jeong et al. | |
| 2007/0047476 A1 * | 3/2007 | Zhao et al. | 370/320 |
| 2007/0218926 A1 | 9/2007 | Zhuang et al. | |
| 2007/0293244 A1 | 12/2007 | Lee et al. | |
| 2008/0070574 A1 * | 3/2008 | Vikberg et al. | 455/435.2 |
| 2009/0274118 A1 | 11/2009 | De Sanctis et al. | |
| 2010/0067492 A1 * | 3/2010 | Kamei | 370/332 |
| 2011/0205946 A1 * | 8/2011 | Avital et al. | 370/311 |

* cited by examiner

Primary Examiner — Lester Kincaid
Assistant Examiner — Diego Herrera

(57) ABSTRACT

Embodiments disclosed herein provide systems and methods for operating a home wireless communication network to facilitate increasing the rescan timer for a wireless communication device. In a particular embodiment, a method comprises determining a location of a wireless communication device that is roaming on a visited wireless network. The method further includes determining a communication load in a portion of the home wireless network that is proximate to the location of the roaming wireless communication device and processing the communication load to determine if a home network rescan timer in the wireless communication device should be increased. If the home network rescan timer in the wireless communication device should be increased, the method further comprises transferring a first message for delivery to the wireless communication device indicating an increase to the home network rescan timer.

20 Claims, 10 Drawing Sheets

WIRELESS COMMUNICATION SYSTEM FOR INCREASING THE RESCAN TIMER IN A WIRELESS COMMUNICATION DEVICE

TECHNICAL BACKGROUND

Wireless communication devices, such as cellular phones, communicate with other devices and systems using wireless communication networks. A user of a wireless device may be a customer of a company that operates a wireless network that the wireless device uses to communicate. However, in some situations, the wireless device is unable to communicate using the company's wireless network. In those situations, the wireless device may be able to communicate using other wireless networks. The wireless device communicating using another wireless network is commonly referred to as roaming.

For various reasons, such as cost and communication efficiencies, it is preferential for a wireless device not to roam. Therefore, a wireless device has a rescan timer for when the wireless device is roaming. The rescan timer provides the wireless device with a period of time, after which the wireless device must search for whether a non-roaming wireless network is available for communications. However, the issues causing the wireless device to roam may still exist on the non-roaming wireless network, thus, causing the wireless device to transfer back and forth between roaming and non-roaming whenever the rescan timer expires. This back and forth transference is commonly called ping ponging and can cause dropped calls and dropped data packets among other communication issues.

OVERVIEW

Embodiments disclosed herein provide systems and methods for operating a home wireless communication network to facilitate increasing the rescan timer for a wireless communication device. In a particular embodiment, a method comprises determining a location of a wireless communication device that is roaming on a visited wireless network. The method further includes determining a communication load in a portion of the home wireless network that is proximate to the location of the roaming wireless communication device and processing the communication load to determine if a home network rescan timer in the wireless communication device should be increased. If the home network rescan timer in the wireless communication device should be increased, the method further comprises transferring a first message for delivery to the wireless communication device indicating an increase to the home network rescan timer.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
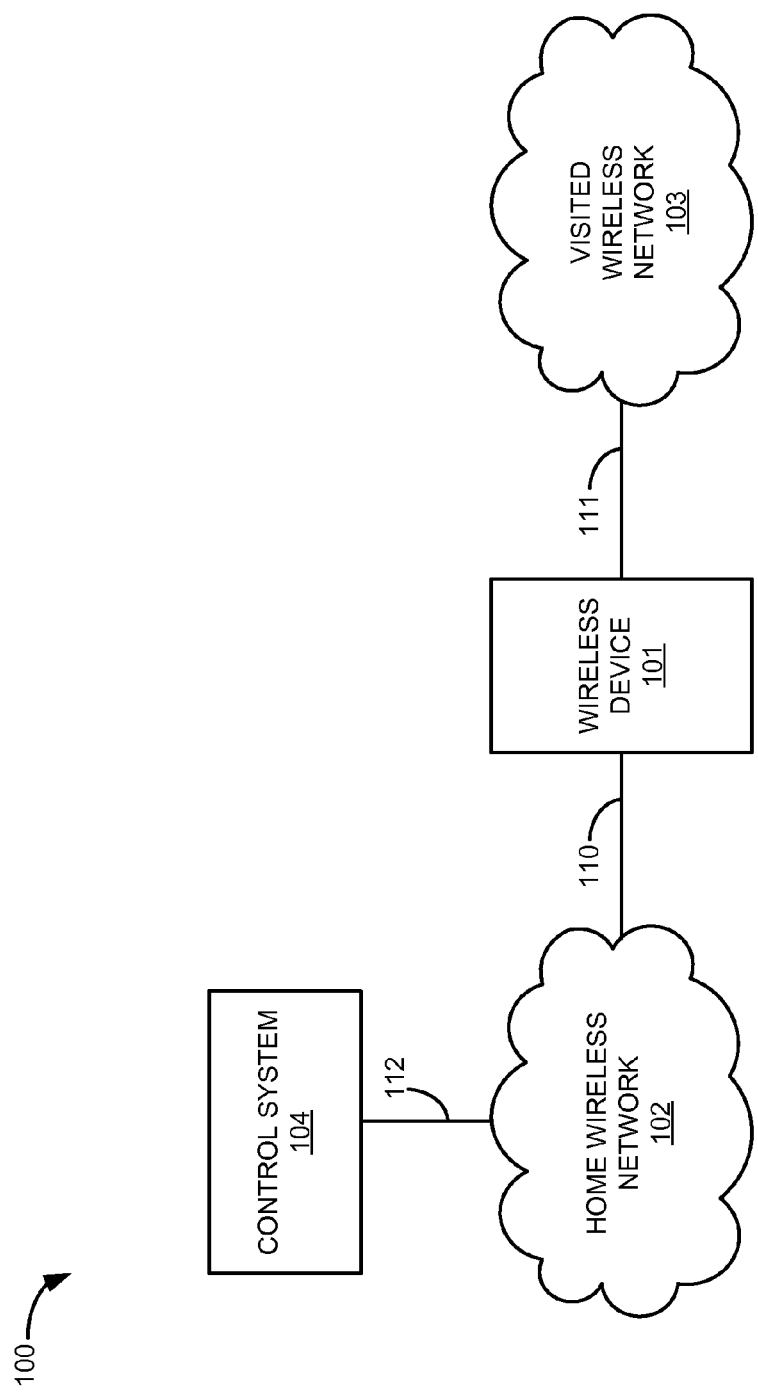
FIG. 1 illustrates a wireless communication system.

FIG. 1 illustrates wireless communication system 100. Wireless communication system 100 includes wireless communication device 101, home wireless network 102, visited wireless network 103, and control system 104. Wireless communication device 101 and home wireless network 102 communicate over wireless link 110. Wireless communication device 101 and visited wireless network 103 communicate over wireless link 111. Control system 104 and home wireless network 102 communicate over link 112.

In operation, wireless device 101 is capable of wirelessly communicating with both home wireless network 102 and visited wireless network 103. Home network 102 may be a network that is associated with wireless device 101. For example, the user of wireless device 101 may be a customer of the company that operates home network 102 while visited network 103 may be operated by a different entity. In some geographic locations wireless device 101 may not be able to communicate with access nodes of home network 102. However, in those locations, wireless device 101 may instead be able to communicate with access nodes of visited network 103.

One condition that may cause wireless device 101 to communicate with visited network 103 instead of home network 102 is that home network 102 may be experiencing a high communication load. More wireless devices communicating with home network 102 in conjunction with more communications exchanged with those devices may cause a high communication load. A high communication load may cause the effective range of the wireless coverage area of home network 102 to be reduced from what the effective range is during periods of lower communication load. Thus, during periods of high communication load, wireless device 101 may need to communication with visited network 103 when wireless device 101 is located in an area that would otherwise be covered by home network 102 during periods of lower communication load.

When communicating with visited network 103, wireless device 101 maintains a home network rescan timer. The rescan timer keeps track of when wireless device 101 should search (or scan) for access nodes on home network 102 so that wireless device 101 can transfer from communicating with visited network 103. If home network 102 is not viable for communications with wireless device 101, then the rescan timer resets and wireless device 101 searches for access nodes on home network 102 again after another time period elapses. Otherwise, if wireless finds an access node on home network 102 that is viable for wireless communications, then wireless device 101 transfers to communicating with home network 102 from visited network 103.

In some situations, however, home network 102 may be under high communication load, or anticipating a high communication load, and would prefer that wireless device 101 continue communicating with visited network 103 in order to lessen the communication load on home network 102. Additionally, the high communication load on home network 102 may cause network performance issues that in turn cause wireless device 101 to ping pong between home network 102 and visited network 103. One way that wireless device 101, when roaming on visited network 103, may be prevented from transferring to home network 102 is by increasing the home wireless network rescan timer of wireless device 101. Increasing the home network rescan timer increases the time period before wireless device 101 scans for home network 102. The added time may allow for the high communication load on home network 102 to subside.

Figure 2:
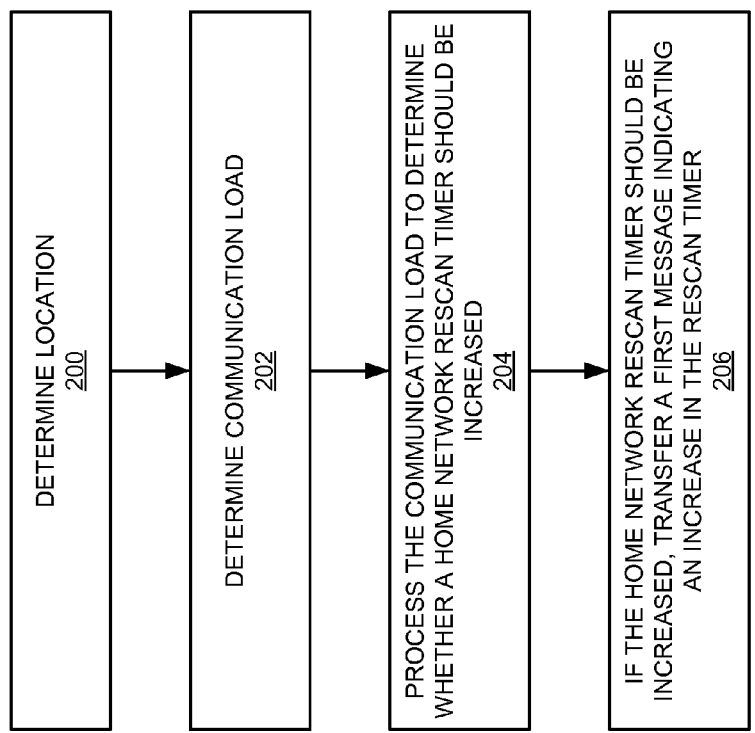
FIG. 2 illustrates the operation of a wireless communication system.

FIG. 2 illustrates the operation of wireless communication system 100. Control system 104 on home network 102 determines a location of wireless device 101, which is roaming on visited network 103 (step 200). Control system 104 may determine the location of wireless device 101 by receiving geographic coordinates from wireless device 101, receiving a base station identifier for a base station communicating with wireless device 101 from either visited network 103 or wireless device 101, by receiving the location of a base station communicating with wireless device 101 from visited network 103, or any other way that control system 104 may acquire the location of wireless device 101. If wireless device 101 transfers the location to control system 104, then wireless device 101 may use a text message indicating the location. If visited network 103 transfers the location to control system 104, then the location may explicitly be included in or derived from an authorization request for wireless device 101 to access visited network 103.

Control system 104 also determines a communication load in a portion home network 102 that is proximate to the location of wireless device 101 (step 202). The portion of home network 102 that is proximate to wireless device 101 may include one or more access nodes on home network 102 that wireless device 101 is most likely to transfer to from visited network 103. The communication load may track the number of wireless communication devices that are connected to home network 102 using the access nodes that are proximate to wireless device 101 along with how much communication traffic is being exchanged between those devices and those access nodes. Control system 104 may determine a communication load for the access nodes as a group or may determine a communication load for each access node individually.

Then, control system 104 processes the communication load to determine whether a home network rescan timer in wireless device 101 should be increased (step 204). Control system 104 may determine that the rescan timer should be increased if the communication load is above a threshold value. Likewise, there may be multiple threshold values that indicate multiple values for increasing the rescan timer based on different levels of communication load. For example, the higher the communication load on home network 101, the greater the increase in the rescan timer. Additionally, in some embodiments, the elements of communication load may be considered separately. For example, if the number of devices communicating with home network 102 is above a threshold then the rescan timer is increased regardless of the communication traffic load, and vice versa.

If control system 104 determines that the home network rescan timer in wireless device 101 should be increased, then control system 104 transfers a first message for delivery to wireless device 101 indicating an increase to the home network rescan timer (step 206). The message may indicate a specific increase value that the rescan timer should be increased, such as a number of minutes and seconds, or wireless device 101 may know or determine itself the appropriate increase in response to the message. The message may be in the form of a text message. The text message may be processed by wireless device 101 without being displayed to a user of wireless device 101 in order to make the rescan timer change transparent to the user.

In some embodiments, control system 104 may determine that the communication load has decreased and, thus, transfers a message to wireless device 101 indicating that the rescan timer should be decreased or returned to a default value.

In further embodiments, the text message from control system 104 may further indicate that wireless device 101 should prefer roaming on visited network 103.

Referring back to FIG. 1, wireless communication device 101 comprises Radio Frequency (RF) communication circuitry and an antenna. The RF communication circuitry typically includes an amplifier, filter, modulator, and signal processing circuitry. Wireless device 101 may also include a user interface, memory device, software, processing circuitry, or some other communication components. Wireless device 101 may be a telephone, computer, e-book, mobile Internet appliance, wireless network interface card, media player, game console, or some other wireless communication apparatus—including combinations thereof.

Home wireless network 102 and visited wireless network 103 are communication networks that comprise telephony switches, wireless access nodes, Internet routers, network gateways, computer systems, communication links, or some other type of communication equipment—including combinations thereof. Wireless access nodes comprise RF communication circuitry and an antenna. The RF communication circuitry typically includes an amplifier, filter, RF modulator, and signal processing circuitry. Wireless access nodes within home network 102 and visited network 103 may also comprise a router, server, memory device, software, processing circuitry, cabling, power supply, network communication interface, structural support, or some other communication apparatus. The wireless access nodes may comprise base station, Internet access node, telephony service node, wireless data access point, or some other wireless communication system—including combinations thereof.

Control system 104 comprises a computer system and communication interface. Control system 104 may also include other components such a router, server, data storage system, and power supply. Control system 104 may reside in a single device or may be distributed across multiple devices. Control system 104 is shown externally to home network 102, but control system 104 could be integrated within the components of home network 102. Control system 104 could be a mobile switching center, network gateway system, Internet access node, application server, service node, or some other communication system—including combinations thereof.

Wireless links 110-111 use the air or space as the transport media. Wireless links 110-111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
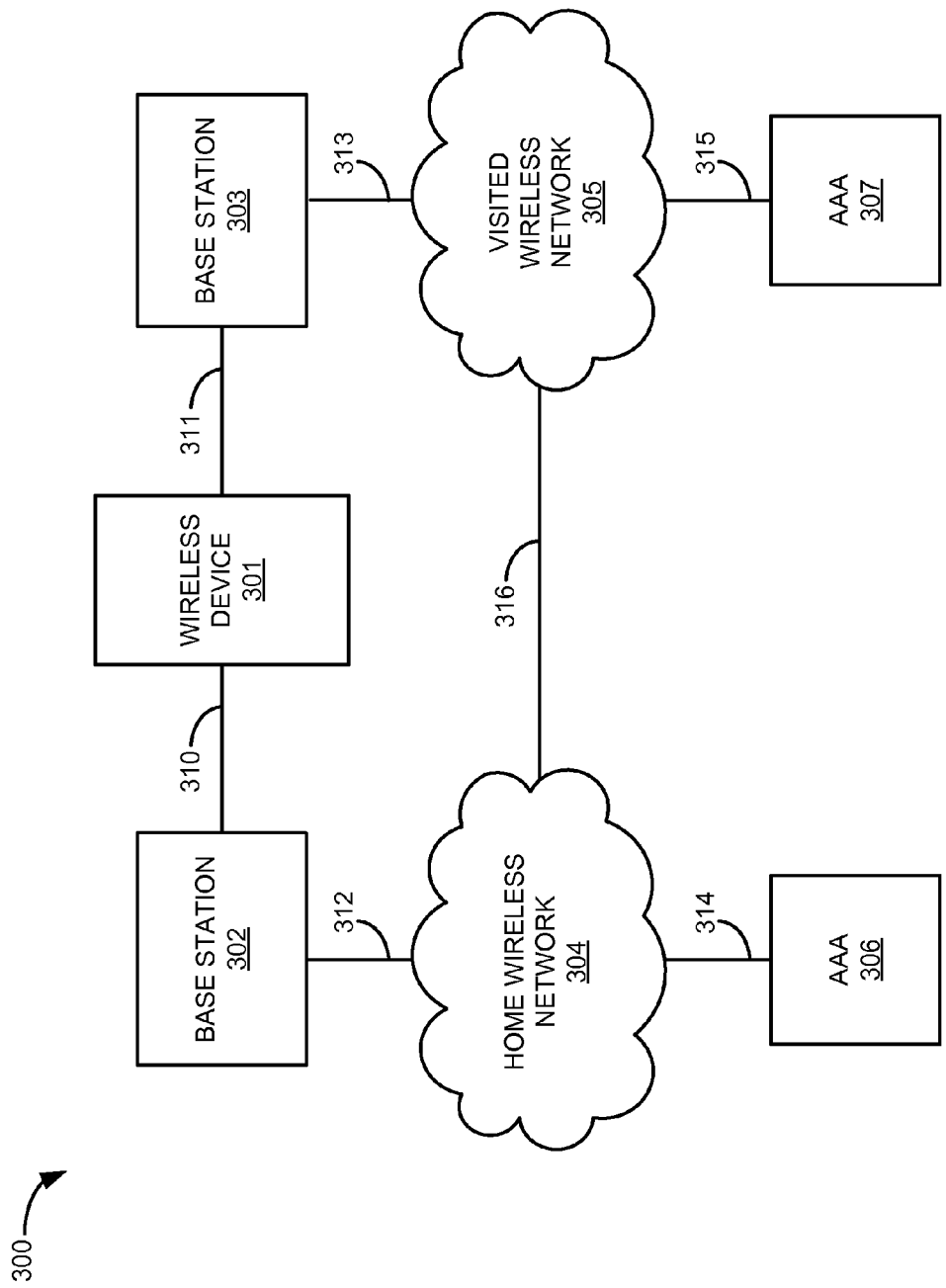
FIG. 3 illustrates a wireless communication system.

FIG. 3 illustrates wireless communication system 300. Wireless communication system 301 includes wireless communication device 301, base station 302, base station 303, home wireless network 304, visited wireless network 305, authentication, authorization, and access system (AAA) 306, and AAA 307. Wireless device 301 and base station 302 communicate over wireless link 310. Wireless device 301 and base station 303 communicate over wireless link 311. Base station 302 and home network 304 communicate over link 312. Base station 303 and visited network 305 communicate over link 313. Home network 304 and AAA 306 communicate over link 314. Visited network 305 and AAA 307 communicate over link 315. Home network 304 and visited network 305 communicate over link 316.

Wireless links 310-311 uses the air or space as the transport media. Wireless links 310-311 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 312-316 use metal, glass, air, space, or some other material as the transport media. Communication links 312-316 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 312-316 could be direct links or may include intermediate networks, systems, or devices.

Figure 4:
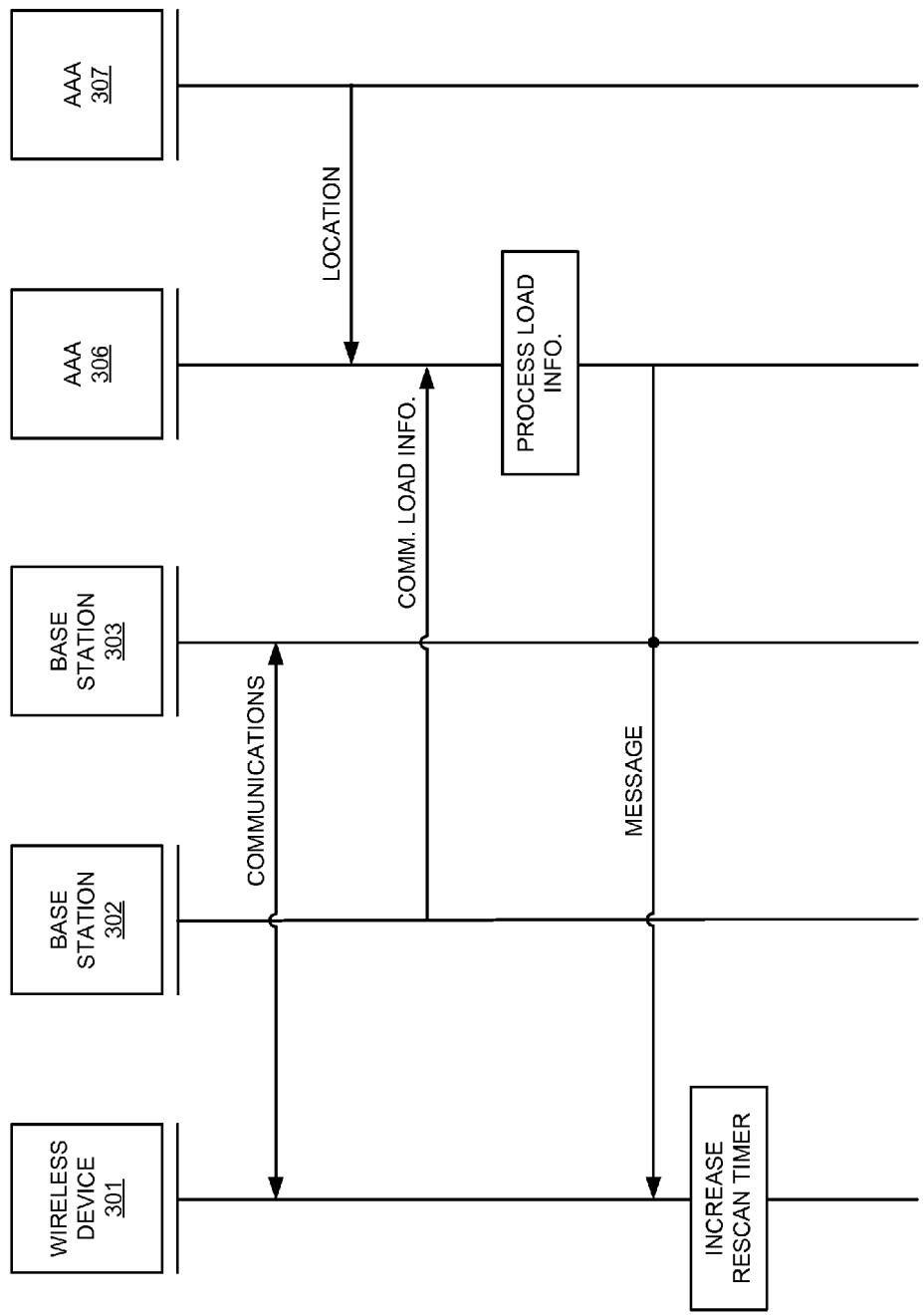
FIG. 4 illustrates the operation of a wireless communication system.

FIG. 4 is a sequence diagram illustrating the operation of wireless communication system 300 in an example embodiment. In FIG. 4 wireless device 301 is roaming on visited network 305 by exchanging communications with base station 303. In order for wireless device 301 to communicate with base station 303 on visited network 305, wireless device 301 must register with AAA 307 on visited network 305. At the time of registration AAA 307 transfers a message to AAA 306 on home network 304 to determine whether wireless device 301 is allowed to roam on visited network 305. The message transferred to AAA 306 indicates that wireless device 301 is roaming and a location of wireless device 301. The location of wireless device 301 may be general, such as the city where wireless device 301 is located, to more specific, such as the location of base station 303 or the geographic coordinates of wireless device 301. The location of base station 303 may be determined based on a base station identifier.

Upon receiving the message notifying AAA 306 that wireless device 301 is roaming on visited network 305 and the location of wireless device 301, AAA 306 determines a communication load of home network 304 proximate to the location of wireless device 301. In this example, base station 302 is the part of home network 304 that AAA 306 determines to be proximate to wireless device 301. AAA 306 determines the communication load by receiving information pertaining to the communication load from base station 302. AAA 306 may have to query base station 302 for the information, the information may be sent periodically to AAA 306, or the information may derived from information sent to AAA 306 as part of regular operational communications with base station 302. For example, AAA 306 may know the number of wireless devices connected to base station 302 based on a number of wireless device registration request transferred to AAA 306 via base station 302, while base station 302, or some other system in home network 302, may need to transfer information regarding bandwidth usage of the wireless devices registered on base station 302 to AAA 306.

AAA 306 then processes the communication load information to determine whether the home network rescan timer in wireless device 301 should be increased. In this example, AAA 306 determines that the communication load is above the level required to trigger an increase in the rescan timer in wireless device 301. Therefore, AAA 306 transfers a text message to wireless device 301 indicating that wireless device 301 should increase its rescan timer. Upon receiving the text message, wireless device 301 increases its rescan timer accordingly, thus, lengthening the timer period before wireless device 301 scans to determine whether base station 302 is available for communications.

Figure 5:
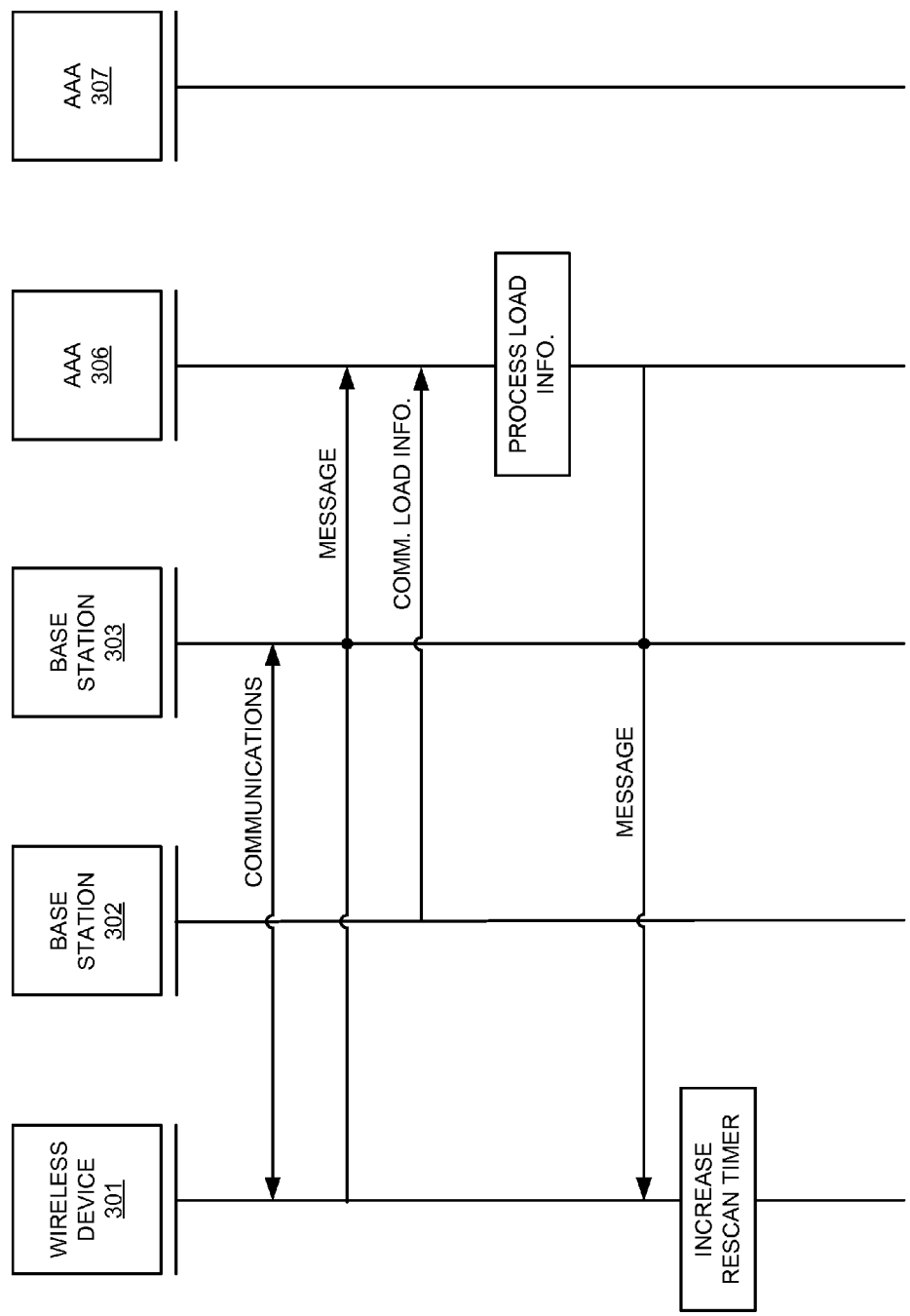
FIG. 5 illustrates the operation of a wireless communication system.

FIG. 5 is a sequence diagram illustrating the operation of wireless communication system 300 in an example embodiment. In FIG. 5 wireless device 301 is roaming on visited network 305 by exchanging communications with base station 303. In order for wireless device 301 to communicate with base station 303 on visited network 305, wireless device 301 must register with AAA 307 on visited network 305. Wireless device 301 recognizes that wireless device 301 is roaming on visited network 305 and transfers a text message to AAA 306 indicating that wireless device 301 is roaming along with geographic coordinates for wireless device 301. Wireless device 301 may have attained the geographic coordinates using the Global Positioning System (GPS).

Upon receiving the text message notifying AAA 306 that wireless device 301 is roaming on visited network 305 and the location of wireless device 301, AAA 306 determines a communication load of home network 304 proximate to the location of wireless device 301. In this example, base station 302 is the part of home network 304 that AAA 306 determines to be proximate to wireless device 301. AAA 306 determines the communication load by receiving information pertaining to the communication load from base station 302. AAA 306 may have to query base station 302 for the information, the information may be sent periodically to AAA 306, or the information may derived from information sent to AAA 306 as part of regular operational communications with base station 302. For example, AAA 306 may know the number of wireless devices connected to base station 302 based on a number of wireless device registration request transferred to AAA 306 via base station 302, while base station 302, or some other system in home network 302, may need to transfer information regarding bandwidth usage of the wireless devices registered on base station 302 to AAA 306.

AAA 306 then processes the communication load information to determine whether the home network rescan timer in wireless device 301 should be increased. In this example, AAA 306 determines that the communication load is above the level required to trigger an increase in the rescan timer in wireless device 301. Therefore, AAA 306 transfers a text message to wireless device 301 indicating that wireless device 301 should increase its rescan timer. Upon receiving the text message, wireless device 301 increases its rescan timer accordingly, thus, lengthening the timer period before wireless device 301 scans to determine whether base station 302 is available for communications.

After wireless device 301 increases the rescan timer, wireless device 301 may continue to send text messages of location updates to AAA 306. AAA 306 may then continue to determine whether the rescan timer should be adjusted further based on the communication load of home network 304 in the updated locations of wireless device 301. Even if wireless device 301 does not move from its original location AAA 306 may continue to determine the communication load on base station 302 to determine whether the rescan timer in wireless device 301 should be adjusted. For example, if the communication load increases then AAA 306 may transfer a text message to wireless device 301 indicating that the rescan timer should be further increased.

Figure 6:
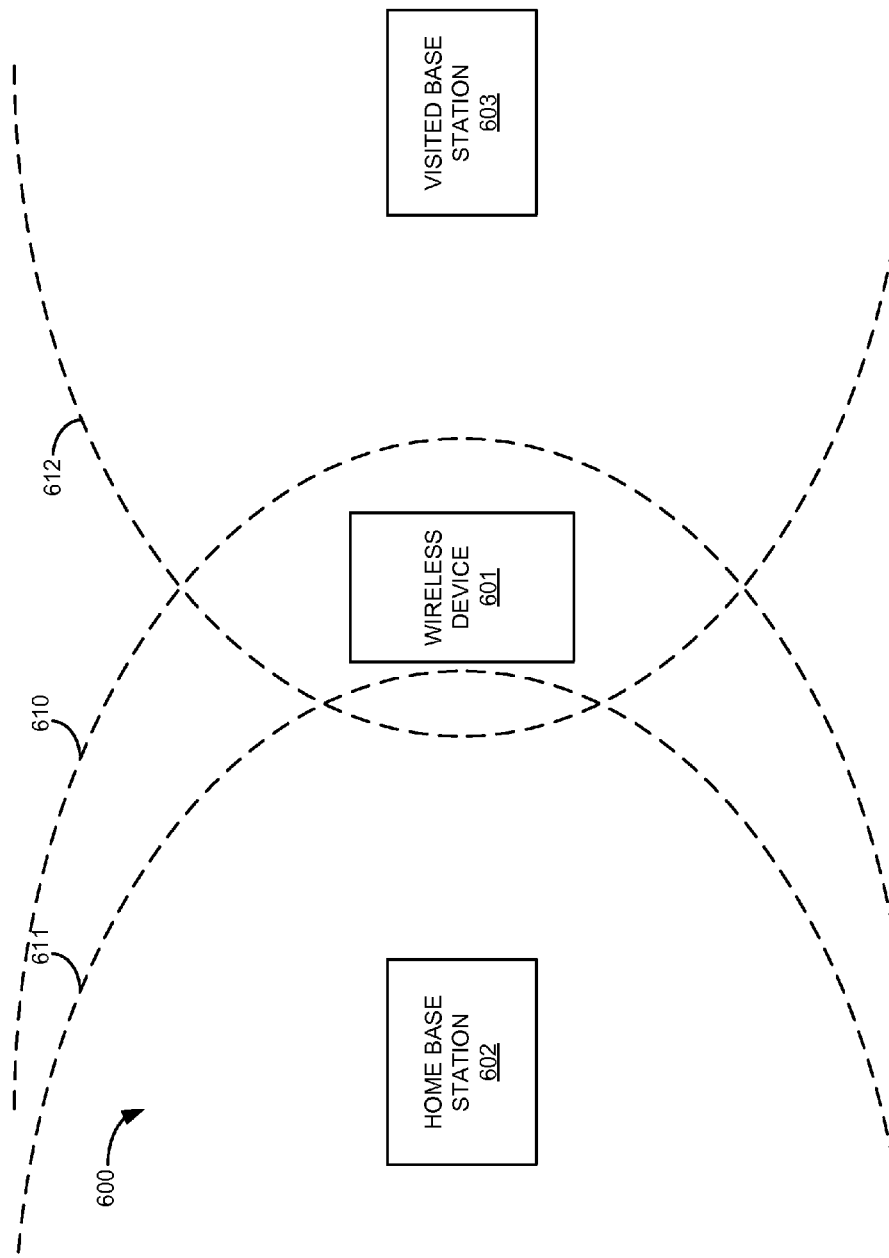
FIG. 6 illustrates a wireless communication system.

FIG. 6 illustrates wireless communication system 600 in an exemplary embodiment. Wireless communication system 600 includes wireless device 601, home base station 602, and visited base station 603. Home base station 602 is connected to a home wireless network, which is not shown for clarity. Visited base station 603 is connected to a visited wireless network, which is not shown for clarity. Home base station 602 provides low load wireless coverage area 610 and high load wireless coverage area 611. Visited base station 603 provides wireless coverage area 612. FIG. 6 is not drawn to any particular scale.

In this example, wireless device 601 is located in an area where wireless coverage areas 610 and 612 overlap. In this area wireless device 601 may communicate with either visited base station 603 or home base station 602. Under high communication load, home base station 302 is only able to provide wireless coverage to a lesser extent, as shown by coverage area 611. Wireless device 601 is roaming on the visited network by communicating with visited base station 302.

A control system in the home wireless network is notified that wireless device 601 is roaming and is provided with the location of wireless device 601. The control system determines that home base station 602 is proximate to the location of wireless device 601. The control system then determines a communication load for home base station 602.

If the control system determines that the communication load on home base station 602 is low, as represented by coverage area 610, then the control system does not indicate the home network rescan timer in wireless device 601 should be changed.

Otherwise, if the control system determines that the communication load on home base station 602 is high, as represented by coverage area 611, then the control system transfers a message indicating that the home network rescan timer in wireless device 601 should be increased. The increase will allow more time for the high communication load on home base station 602 to dissipate before wireless device 601 scans for the home network. Thus, even as wireless device 301 moves further into coverage area 611, wireless device 301 will not scan for home base station 602 until the increased rescan timer expires.

Figure 7:
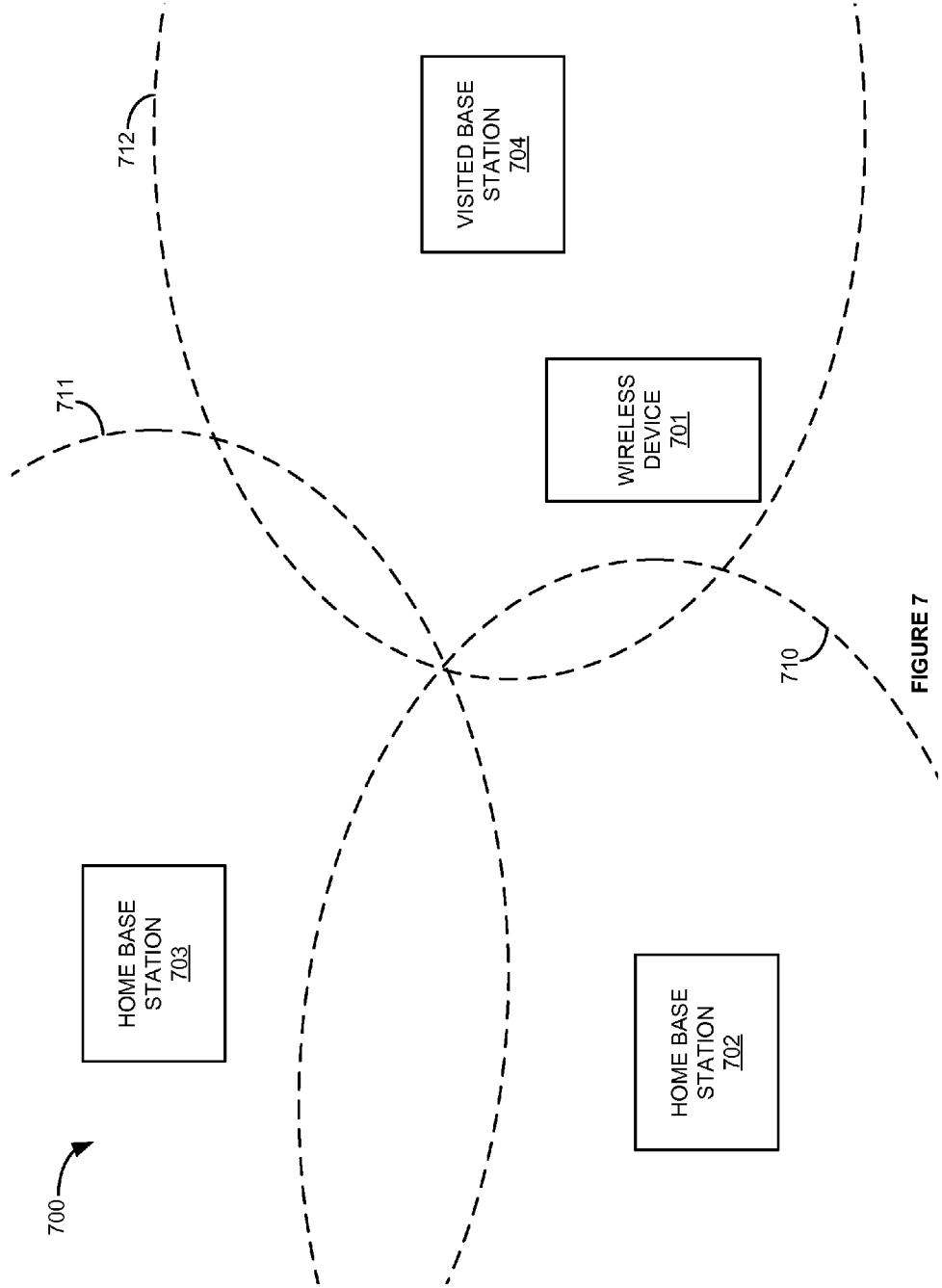
FIG. 7 illustrates a wireless communication system.

FIG. 7 illustrates wireless communication system 700 in an exemplary embodiment. Wireless communication system 700 includes wireless device 601, home base station 702, home base station 703, and visited base station 704. Home base stations 702 and 703 are connected to a home wireless network, which is not shown for clarity. Visited base station 704 is connected to a visited wireless network, which is not shown for clarity. Home base station 702 provides wireless coverage area 710. Home base station 703 provides wireless coverage area 711. Visited base station 704 provides wireless coverage area 712. FIG. 7 is not drawn to any particular scale.

In this example wireless device 701 is roaming on the visited wireless network via visited base station 704. A control system in the home network receives notification that wireless device 701 is roaming and a location of wireless device 701. The control system then determines a communication load on home base stations 702 and 703 because home base stations 702 and 703 are proximate to wireless device 701.

Control system then processes the communication load to determine whether a home network rescan timer in wireless device 701 should be increased. The control system may use various methods to determine whether the rescan timer should be increased, including, but not limited to, the following examples. In one example, the control system may process the combined communication load of home base stations 702 and 703 to determine whether the combined communication load is above a threshold value. Alternatively, the control system may process each communication load separately then determine the appropriate increase in the rescan timer based on the base station with the higher communication load. Similarly, the control system may receive more location information about wireless device 701 that allows the control system to predict which of home base stations 702 or 703 that wireless device 701 is moving towards. For instance, if wireless device 701 is moving towards home base station 703, then the control system may determine a rescan timer increase based on the communication load of home base station 703 instead of home base station 702.

After determining an increase value for the home network rescan timer, the control system transfers a text message to wireless device 701 indicating the increase and wireless device 701 increases the rescan timer accordingly.

Figure 8:
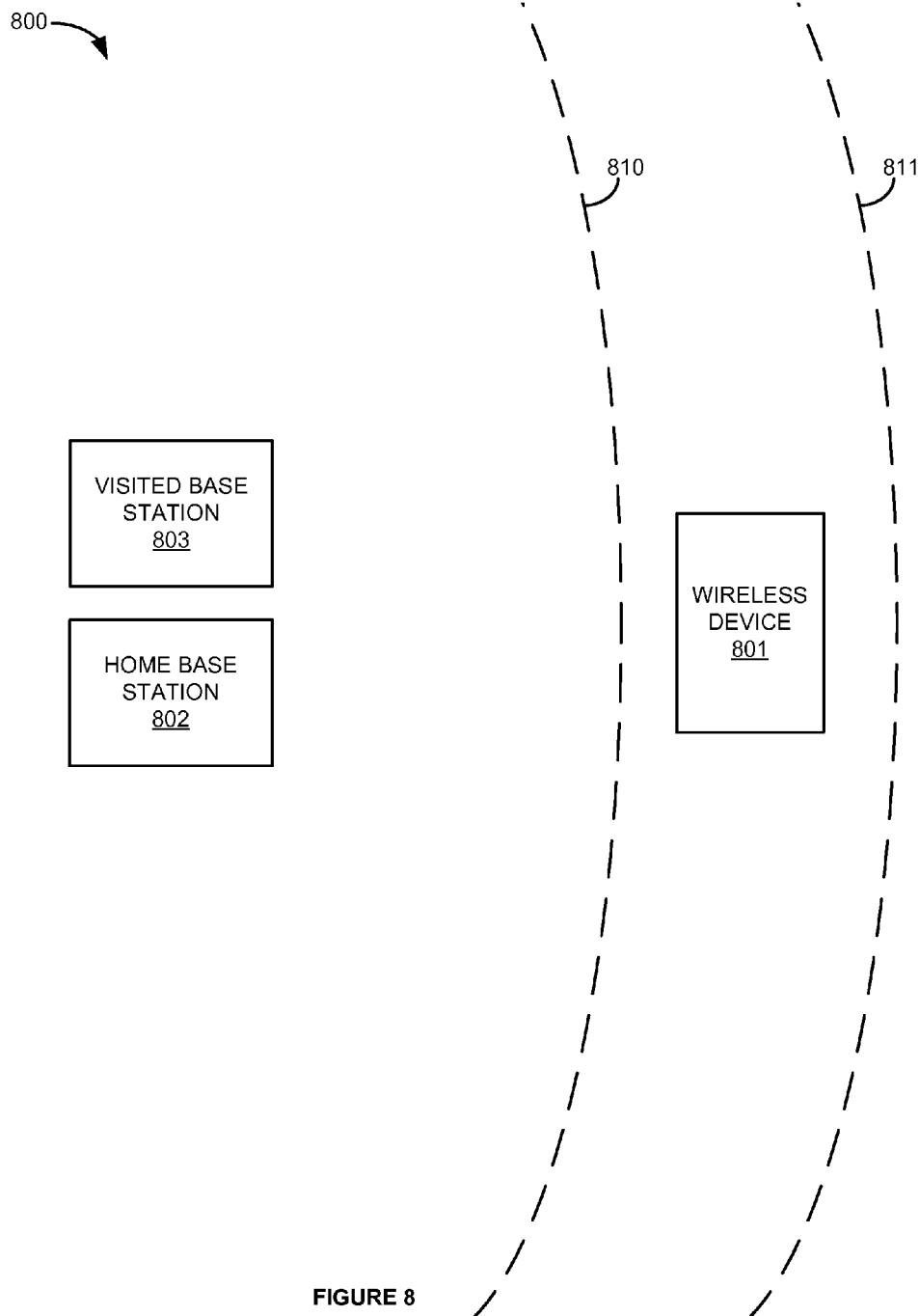
FIG. 8 illustrates a wireless communication system.

FIG. 8 illustrates wireless communication system 800. Wireless communication system 800 includes wireless device 801, home base station 802, and visited base station 803. Home base station 802 is connected to a home wireless network, which is not shown for clarity. Visited base station 803 is connected to a visited wireless network, which is not shown for clarity. Home base station 802 provides coverage area 810. Visited base station 803 provides coverage area 811. FIG. 8 is not drawn to any particular scale.

In this example, home base station 802 is under high communication load from wireless devices not shown in FIG. 8 for clarity. While coverage area 810 is shown with a smaller radius than coverage area 811 due to the high communication load of home base station 802, coverage area 810 need not necessarily be smaller due to the high communication load. Wireless device 801 is roaming on the visited wireless network via visited base station 803. Wireless device 801 may be roaming because it was outside coverage area 810, some performance issue with coverage area 810, or any other reason that may cause wireless device 801 to roam.

A control system in the home wireless network receives notification that wireless device 801 is roaming and receives a location of wireless device 801. The control system determines that home base station 802 is proximate to wireless device 801 and determines a communication load for home base station 802. The communication load is processed by the control system to determine an increase for the home network rescan timer in wireless device 801. The control system then sends a text message indicating the rescan timer increase to wireless device 801. Wireless device 801 then adjusts the rescan timer accordingly.

Figure 9:
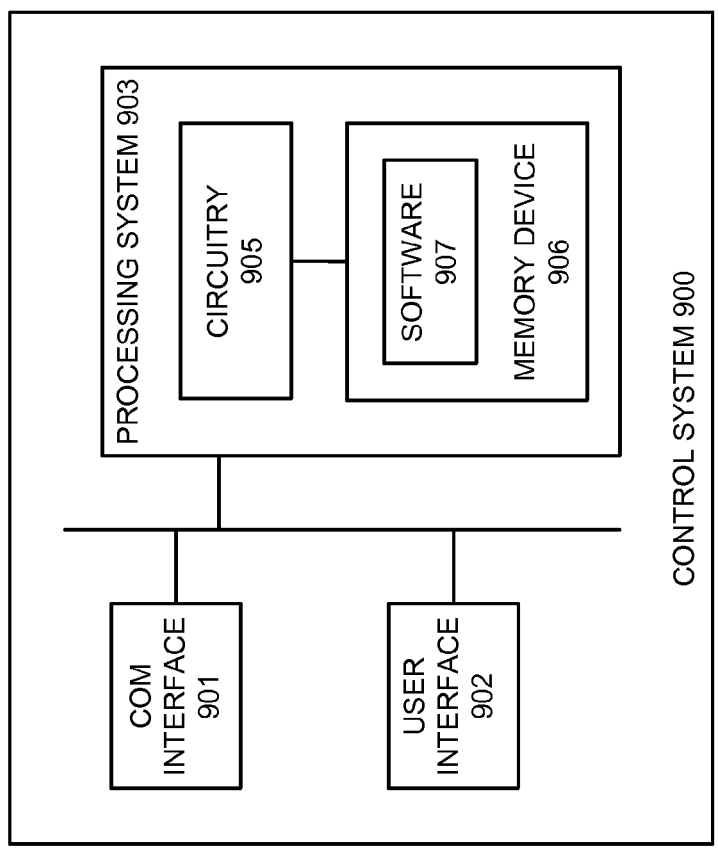
FIG. 9 illustrates a wireless control system.

FIG. 9 illustrates control system 900. Control system 900 is an example of control system 104, although control system 104 may use alternative configurations. Control system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a disk drive, flash drive, data storage circuitry, or some other memory apparatus. Operating software 907 comprises computer programs, firmware, or some other form of machine-readable processing instructions. Operating software 907 may include an operating system, utilities, drivers, network interfaces, applications, or some other type of software. When executed by circuitry 905, operating software 907 directs processing system 903 to operate communication control system 900 as described herein.

In particular, operating software 907 directs processing system 903 to determine a location of a wireless communication device that is roaming on a visited wireless network. Processing system 903 also determines a communication load in a portion of a home wireless network that is proximate to the location of the roaming wireless communication device. Then, processing system 903 processes the communication load to determine whether a home network rescan timer in the wireless communication device should be increased. If the home network rescan timer in the wireless communication device should be increased, communication interface 901 transfers a first message for delivery to the wireless communication device indicating an increase to the home network rescan timer.

Figure 10:
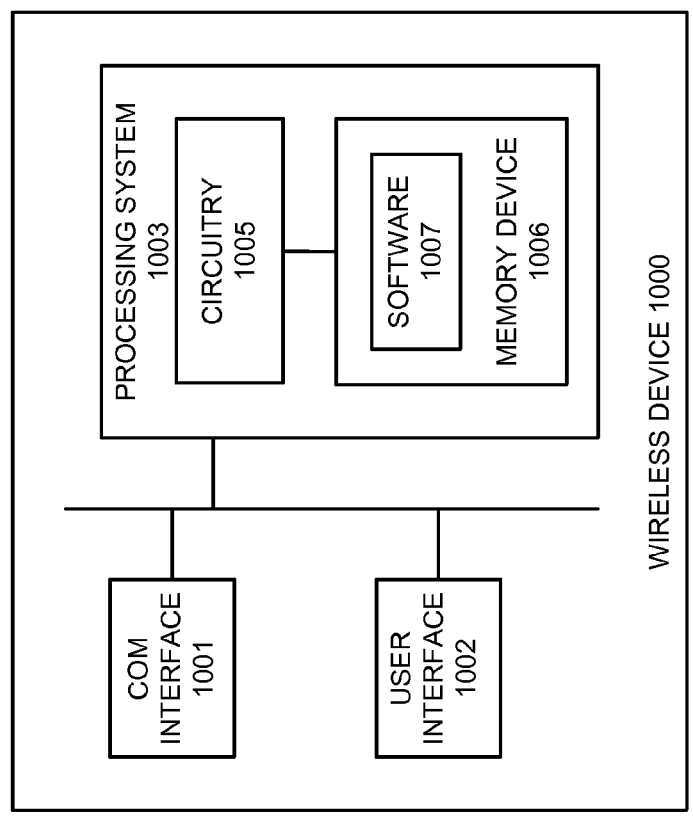
FIG. 10 illustrates a wireless communication device.

FIG. 10 illustrates wireless communication device 1000. Wireless communication device 1000 is an example of wireless communication device 101, although device 101 could use alternative configurations. Wireless communication device 1000 comprises wireless communication interface 1001, user interface 1002, and processing system 1003. Processing system 1003 is linked to wireless communication interface 1001 and user interface 1002. Processing system 1003 includes processing circuitry 1005 and memory device 1006 that stores operating software 1007. Wireless communication device 1001 may include other well-known components such as a battery and enclosure that are not shown for clarity. Wireless communication device 1001 may be a telephone, computer, e-book, mobile Internet appliance, media player, game console, wireless network interface card, or some other wireless communication apparatus—including combinations thereof.

Wireless communication interface 1001 comprises RF communication circuitry and an antenna. The RF communication circuitry typically includes an amplifier, filter, RF modulator, and signal processing circuitry. Wireless communication interface 1001 may also include a memory device, software, processing circuitry, or some other communication device. Wireless communication interface 1001 may use various protocols, such as CDMA, EVDO, WIMAX, GSM, LTE, WIFI, HSPA, or some other wireless communication format.

User interface 1002 comprises components that interact with a user to receive user inputs and to present media and/or information. User interface 1002 may include a speaker, microphone, buttons, lights, display screen, touch screen, touch pad, scroll wheel, communication port, or some other user input/output apparatus—including combinations thereof. User interface 1002 may be omitted in some examples.

Processing circuitry 1005 comprises microprocessor and other circuitry that retrieves and executes operating software 1007 from memory device 1006. Memory device 1006 comprises a disk drive, flash drive, data storage circuitry, or some other memory apparatus. Processing circuitry 1005 is typically mounted on a circuit board that may also hold memory device 1006 and portions of communication interface 1001 and user interface 1002. Operating software 1007 comprises computer programs, firmware, or some other form of machine-readable processing instructions. Operating software 1007 may include an operating system, utilities, drivers, network interfaces, applications, or some other type of software. When executed by processing circuitry 1005, operating software 1007 directs processing system 1003 to operate wireless communication device 1000 as described herein.

In particular, communication interface 1001 receives a first message from a control system in a home wireless network indicating an increase to a home network rescan timer in wireless device 1000. Then, operating software 1007 directs processing system 1003 to increase the rescan timer in accordance with the message. Communication interface 1001 may also transfer a message to the control system indicating that wireless device 1000 is roaming and indicating a location of wireless device 1000.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a home wireless communication network comprising:
 determining a location of a wireless communication device that is roaming on a visited wireless network;
 determining a communication load in a portion of the home wireless network that is proximate to the location of the roaming wireless communication device;
 processing the communication load to determine whether a home network rescan timer in the wireless communication device should be increased; and
 if the home network rescan timer in the wireless communication device should be increased, transferring a first message for delivery to the wireless communication device indicating an increase to the home network rescan timer.

2. The method of claim 1 wherein the first message comprises a text message.

3. The method of claim 1 wherein determining the location of the roaming wireless communication device comprises receiving an authorization request transferred by the visited wireless network.

4. The method of claim 3 wherein the authorization request indicates a base station in the visited wireless network that serves the roaming wireless communication device and wherein the base station indicates the location.

5. The method of claim 3 wherein the authorization request indicates a control system in the visited wireless network that serves the roaming wireless communication device and wherein the control system indicates the location.

6. The method of claim 1 wherein determining the location of the roaming wireless communication device comprises receiving a second message transferred by the roaming wireless communication device.

7. The method of claim 6 wherein the second message comprises a text message.

8. The method of claim 6 wherein the second message indicates a base station in the visited wireless network that serves the roaming wireless communication device and wherein the base station indicates the location.

9. The method of claim 6 wherein the second message indicates a control system in the visited wireless network that serves the roaming wireless communication device and wherein the control system indicates the location.

10. The method of claim 1 wherein the portion of the home wireless network proximate to the location of the roaming wireless communication device comprises a sector in the home wireless network that is adjacent to a base station in the visited wireless network that serves the roaming wireless communication device.

11. A control system on a home wireless communication network comprising:
    a processing system configured to determine a location of a wireless communication device that is roaming on a visited wireless network, determine a communication load in a portion of the home wireless network that is proximate to the location of the roaming wireless communication device, and process the communication load to determine whether a home network rescan timer in the wireless communication device should be increased;
    a communication interface configured to, if the home network rescan timer in the wireless communication device should be increased, transfer a first message for delivery to the wireless communication device indicating an increase to the home network rescan timer.

12. The control system of claim 11 wherein the first message comprises a text message.

13. The control system of claim 11 wherein the communication interface is further configured to receive an authorization request transferred by the visited wireless network and the processing system is configured to determine the location of the roaming wireless communication device based on the authorization request.

14. The control system of claim 13 wherein the authorization request indicates a base station in the visited wireless network that serves the roaming wireless communication device and wherein the base station indicates the location.

15. The control system of claim 13 wherein the authorization request indicates a control system in the visited wireless network that serves the roaming wireless communication device and wherein the control system indicates the location.

16. The control system of claim 11 wherein the communication interface is further configured to receive a second message transferred by the roaming wireless communication device and the processing system is configured to determine the location of the roaming wireless communication device based on the second message.

17. The control system of claim 16 wherein the second message comprises a text message.

18. The control system of claim 16 wherein the second message indicates a base station in the visited wireless network that serves the roaming wireless communication device and wherein the base station indicates the location.

19. The control system of claim 16 wherein the second message indicates a control system in the visited wireless network that serves the roaming wireless communication device and wherein the control system indicates the location.

20. The control system of claim 11 wherein the portion of the home wireless network proximate to the location of the roaming wireless communication device comprises a sector in the home wireless network that is adjacent to a base station in the visited wireless network that serves the roaming wireless communication device.

* * * * *